(12) United States Patent
Yang et al.

(10) Patent No.: US 7,489,456 B2
(45) Date of Patent: Feb. 10, 2009

(54) LENS MODULE

(75) Inventors: Wen-Fu Yang, Taipei (TW); Hai-En Tsai, Taipei (TW); Ya-Huei Yang, Taitung (TW); Wei-Jr Chen, Taipei (TW)

(73) Assignee: International Currency Technologies Corporation, Taipei (TW)

( * ) Notice: Subject to any disclaimer, the term of this patent is extended or adjusted under 35 U.S.C. 154(b) by 99 days.

(21) Appl. No.: 11/797,245

(22) Filed: May 2, 2007

(65) Prior Publication Data

US 2008/0273255 A1 Nov. 6, 2008

(51) Int. Cl.
*G02B 7/02* (2006.01)
(52) U.S. Cl. ................ 359/819; 359/619; 359/811; 347/242
(58) Field of Classification Search ........... 359/619, 359/811, 819; 353/100; 396/529; 347/242
See application file for complete search history.

(56) References Cited

U.S. PATENT DOCUMENTS 6,646,807 B2 * 11/2003 Yoshikawa et al. .......... 359/619
7,187,501 B2 *  3/2007 Wakisaka ................. 359/622

* cited by examiner

*Primary Examiner*—Joseph Martinez
(74) *Attorney, Agent, or Firm*—Bacon & Thomas, PLLC

(57) ABSTRACT

A lens module includes a holder base, which is affixed to a circuit board and has bottom receiving holes for receiving LEDs or sensors on the circuit board and a top flange with a foolproof notch, a lens device press-fitted into the top flange and secured to the foolproof notch to ensure accurate positioning and having flat protrusions engaged into respective through holes in the holder base in alignment with the LEDs or sensors, and a top cover capped on the holder base to hold down the lens device and having through holes that receive convex portions of the lens device respectively.

9 Claims, 9 Drawing Sheets

LENS MODULE

BACKGROUND OF THE INVENTION

1. Field of the Invention

The present invention relates to lens modules and more particularly, to a lens module for use in a bill acceptor for detecting the authenticity of a bill, and the lens module has multiple positioning structures to have a lens device positively and accurately positioned in between a holder base and a top cover.

2. Description of the Related Art

Following fast development of technology, our mode of living has been changed. Various automatic vending machines (card dispensers, ticket vending machines, money exchanging machines, etc.) are used everywhere to sell any of a variety of products without serviceman. Providing automatic vending machines saves much labor cost, and brings great convenience to consumers. A money-exchanging machine generally comprises a coin acceptor and a bill acceptor.

However, venders and consumers are always assailed by the problem of counterfeit money since the use of paper currency. Following development of computer technology, evil persons may use a computer to scan, copy and print paper money. Therefore, a paper currency has anti-counterfeiting techniques. Visible anti-counterfeiting techniques of paper currency include paper material, ink, seal, mark and etc. that can easily be verified with the eyes. However, examining invisible anti-counterfeiting techniques requires a special machine or instrument to verity the authenticity. A validator for this purpose uses rollers to carry the inserted paper currency over a magnetic head, which detects the magnetic inks of the emblems and portrait and compares the detected signal with respective predetermined reference values for determining the authenticity of the paper current subject to the comparison result. However, the magnetic head tends to be contaminated by ink dirt, resulting in an inaccurate detection. Further, a counterfeit currency maker may make a counterfeit currency that carrying similar magnetic inks to cheat the machine.

Nowadays, modern valuable paper validators commonly use different LEDs (light emitting diodes) to emit different light for examining the characteristics of different paper currency. FIGS. 9 and 10 show a prior art valuable paper (bill) validator. This design of valuable paper validator comprises a first linear light source A1 and a second linear light source A2 disposed at two sides above a test zone F1, a plurality of photo sensors C1 set between the two linear light sources A1 and A2, and a first optical element B1 set below the photo sensors C1. When a document (valuable paper) E1 enters an inlet of the valuable paper validator, the inlet is blocked, and a sheet-transferring roller set is started to carry the document E1 through the test zone F1. At the same time the linear light sources A1 and A2 are controlled to emit pulsed light onto the document E1, the first optical element B1 condenses reflected light onto the photo sensors C1, and the photo sensors C1 feedback the detected value at a predetermined circulation time point. This detected value is indicative of the average PPF (paired-pulse facilitation) of the scanned surface color of the document E1. The aforesaid method is to examine the whole document. Further, a supplementary light source A4 and a fourth optical element B4 may be provided at the other side. The supplementary light source A4 is controlled to emit penetrative light that passes through the document E1 for checking the transmission of the document E1. After scanning, the operating unit of the valuable paper validator receives different values produced by different light sources and compares the values to storage reference values, thereby determining to accept or reject the document. According to this induction method, it is necessary to verify multiple strip blocks of the document E1 and to compare the scanned values produced by the strip blocks to reference values for further determination. According to this design, each linear light source A1 or A2 uses different colors of light emitting diodes A3 to emit different colors of light for verification. Further, a second optical element B2 and a third optical element B3 are set in front of the first linear light source A1 and the second linear light source A2 to correct the respective light source output angle. The arrangement of the linear light sources A1 and A2, the optical elements B1, B2 and B3 and the photo sensors C1 must be carefully calculated so that detected signals can be compared to reference values for further accurate determination.

The aforesaid prior art valuable paper validator has numerous drawbacks as outlined hereinafter.

1. Because the LEDs A3 in each linear light source A1 or A2 are spaced from one another at a distance, these LEDs A3 do not allow the document E1 to be examined at one same test zone F1 with different colors of light, and can only use the average value of all scanned light to calculate the surface color reaction of the document E1.
2. Different documents (paper currency) E1 from different countries have different anti-counterfeiting characteristics. Therefore, the main unit must provide a high capacity database for storing predetermined reference data for comparison.
3. This validation method uses the light emitting diodes A3 to emit different colors of light onto the document E1, and the photo sensors C1 with the first optical element B1 to collect reflected light from different strip blocks of the document E1 for comparing to reference values. The precision of the adjustment between the light emitting diodes A3, the photo sensors C1 and the optical elements B1, B2, and B3 is critical.
4. After scanning of different strip blocks of the document E1 with different colors of light from the light emitting diodes A3, a precision array computing procedure is necessary to verify the authenticity of the document E1. This computing procedure requires a certain length of time, not suitable for use in a vending machine to verify the authenticity of a paper money.
5. The complicated structure of this design of valuable paper validator uses so many parts, resulting in a high manufacturing cost.

Further, ATMs (Auto Teller Machines) or bill counters used in a banking system commonly use ultraviolet lamps to scan paper currency. Ultraviolet lamps are not suitable for use in a bill validator for vending machine. When an ultraviolet lamp type bill validator is used in an outdoor vending machine, air moisture may pass through gap between the lamp bulb and the electric socket, causing a short circuit. Further, the bulb of an ultraviolet lamp attenuates quickly with use. Further, an ultraviolet lamp consumes much electric power and releases much heat energy during operation. Further, an ultraviolet lamp has a big side and a short working life, and is easy to break.

SUMMARY OF THE INVENTION

The present invention has been accomplished under the circumstances in view.

According to one aspect of the present invention, the lens module is comprised of a holder base, a lens device mounted in the top side of the holder base, and a top cover capped on the holder base to hold down the lens device. The holder base has a top flange protruded from the top side, a foolproof notch at one end of the top flange, and a plurality of locating holes bilaterally asymmetrically disposed in the top side within the area defined by the top flange. The lens device is press-fitted into the space surrounded by the top flange, having a protruding block engaged into the foolproof notch and a plurality of locating pins respectively fitted into the locating holes of the holder base. Thus, the lens device is accurately and positively positioned in between the holder base and the top cover.

According to another aspect of the present invention, the lens device has a plurality of flat protrusions protruded from the bottom surface and respectively fitted into respective through holes in the holder base in accurate alignment with the LEDs or sensors of the circuit board in which the holder base is installed, and a plurality of convex portions protruded from the top surface corresponding to the flat protrusions. Therefore, the alignment of the lens device with the LEDs or sensors of the circuit board is automatically achieved after installation of the lens module in the circuit board, and no further alignment procedure is necessary.

According to still another aspect of the present invention, the lens module is designed for use in a bill acceptor. During application, the flat protrusions and the convex portions of the lens device of the lens module at the circuit board of the light-emitting unit of the bill acceptor direct different wavelengths of light from the LEDs of the associating circuit board to the convex portions of the lens device of the lens module at the circuit board of the light-receiving unit of the bill acceptor so that the flat protrusions of the lens device of the lens module at the circuit board of the light-receiving unit condense respective light beams onto the sensors of the associating circuit board for bill authenticity verification. This design prevents interference among light beams from different LEDs, improving the verification accuracy of the bill acceptor.

DETAILED DESCRIPTION OF THE PREFERRED EMBODIMENT

Figure 1:
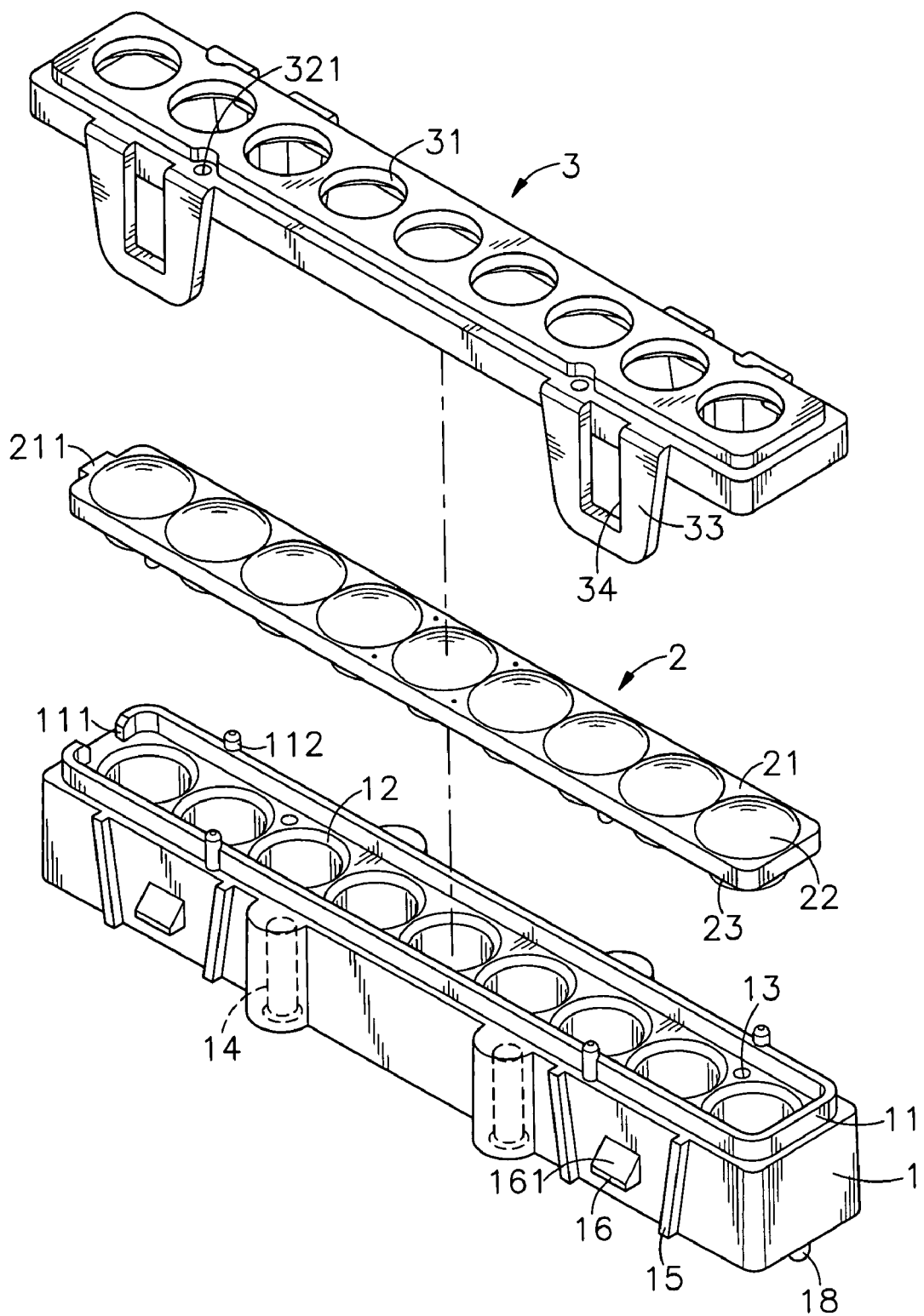
FIG. 1 is an exploded view of a lens module according to the present invention.
Figure 2:
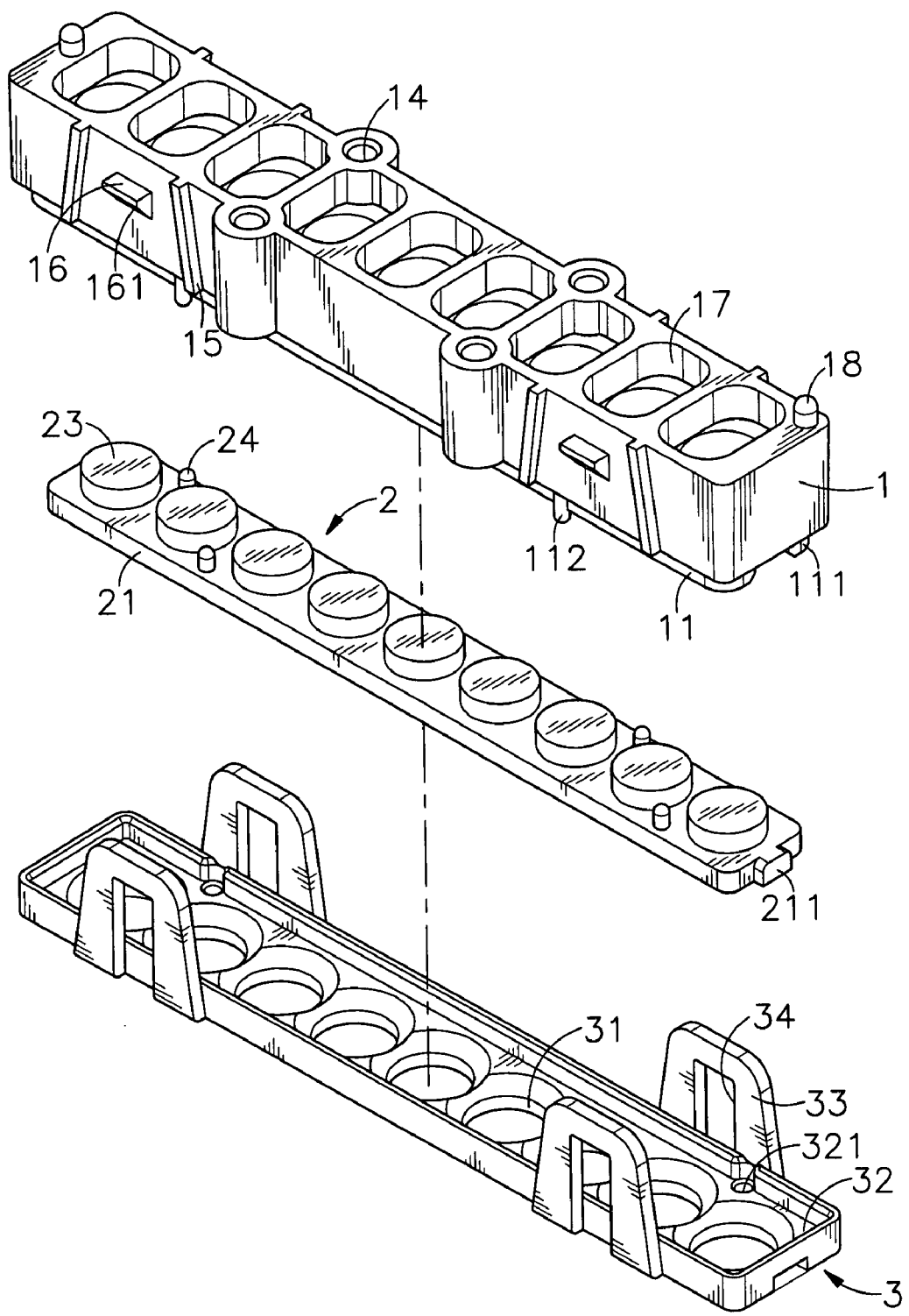
FIG. 2 corresponds to FIG. 1 when viewed from another angle.
Figure 3:
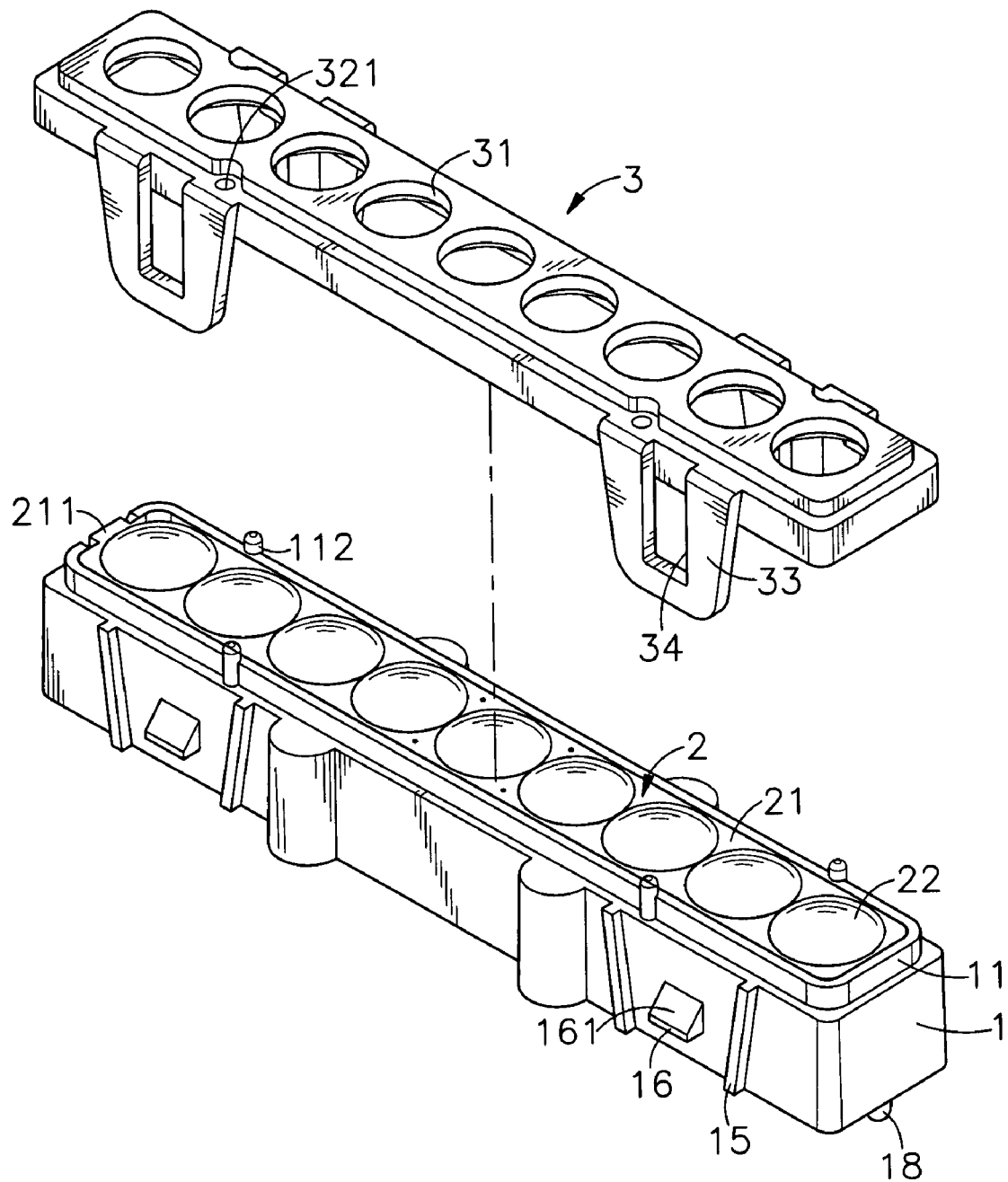
FIG. 3 corresponds to FIG. 1 but showing the lens device mounted inside the top flange of the holder base.
Figure 4:
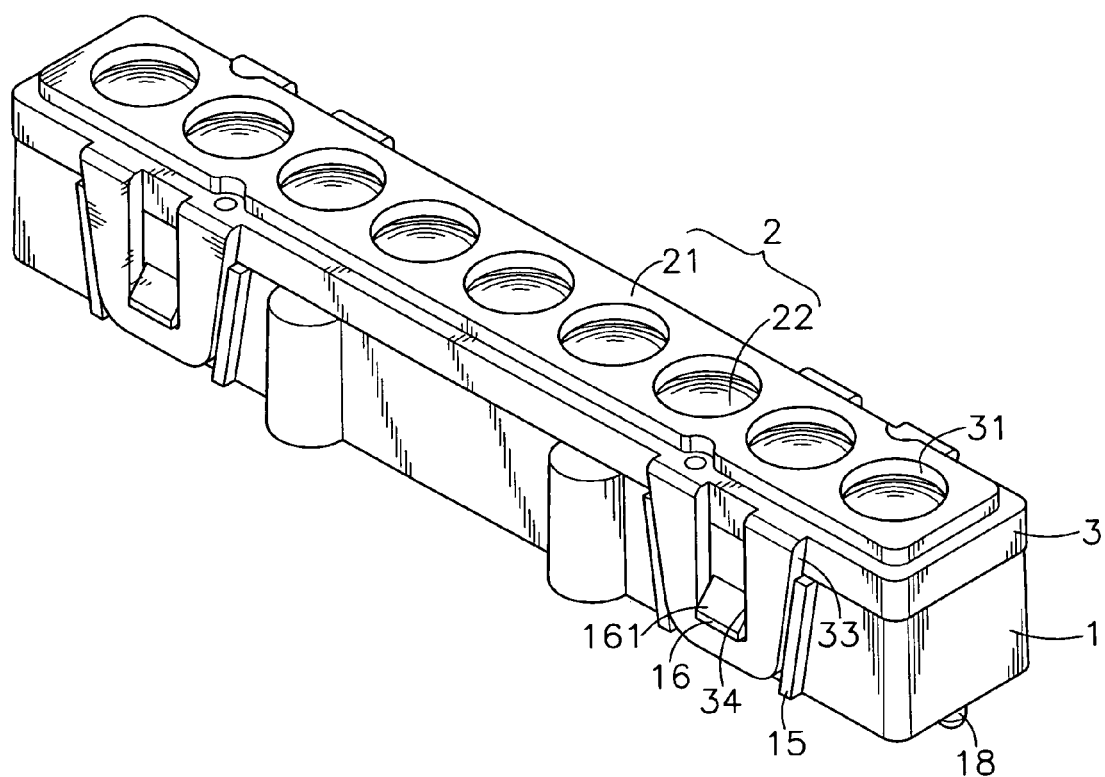
FIG. 4 is an elevational assembly view of the lens module according to the present invention.

Referring to FIGS. 1~4, a lens module in accordance with the present invention is shown comprised of a holder base 1, a lens device 2 and a top cover 3.

The holder base 1 is a narrow elongated member having a top flange 11 upwardly extending from its top side, a plurality of vertical through holes 12 arranged in a row and surrounded by the top flange 11, a plurality of locating holes 13 formed on its top side and asymmetrically arranged at two opposite sides relative to the row of through holes 12 within the area surrounded by the top flange 11, a foolproof notch 111 at one end of the top flange 11, a plurality of locating rods 112 asymmetrically provided at two sides of the top flange 11 and protruding over the topmost edge of the top flange 11, a plurality mounting portions 14 symmetrically disposed at its two opposite lateral sides for fastening to a circuit board, a plurality of guide tracks 15 symmetrically arranged at its two opposite lateral sides and gradually reducing in width in direction from its top side toward its bottom side, a plurality of retaining blocks 16 respectively protruded from its two opposite lateral sides in each of the guide tracks 15, each retaining block 16 having sloping top surface 161, a plurality of bottom receiving holes 17 formed on its bottom side corresponding to the through holes 12, and a plurality of bottom mounting rods 18 extending from its bottom side for fastening to a circuit board.

The lens device 2 is positioned in the top side of the holder base 1 within the top flange 11, having a narrow elongated flat lens base 21, a protruding block 211 extending from one end of the flat lens base 21 and engaged into the foolproof notch 111 of the top flange 11 of the holder base 1, a plurality of convex portions 22 protruding from the top side of the flat lens base 21, a plurality of flat protrusions 23 protruded from the bottom side of flat lens base 21 and shaped like a cylinder and respectively fitted into the through holes 12 of the holder base 1, and a plurality of locating pins 24 respectively extended from the bottom side of the flat lens base 21 and respectively fitted into the locating holes 13 of the holder base 1.

The top cover 3 is capped on the holder base 1 to hold down the lens device 2, having a plurality of through holes 31 corresponding to the convex portions 22 of the lens device 2, a bottom recess 32, which receives the top flange 11 of the holder base 1 and the lens device 2 within the top flange 11, a plurality of locating holes 321 formed in its bottom side within the bottom recess 32 and respectively forced into engagement with the locating rods 24 of the holder base 1, and a plurality of retaining lugs 33 downwardly extending from its two opposite lateral sides and respectively engaged into the guide tracks 15 of the holder base 1. The retaining lugs 33 each define a retaining hole 34 respectively forced into engagement with the retaining blocks 16 of the holder base 1.

During assembly of the lens module, the lens device 2 is press-fitted into the inside of the top flange 11 to force the protruding block 211 and the locating pins 24 into the foolproof notch 111 and locating holes 13 of the holder base 1 respectively, keeping the flat protrusions 23 engaged in the through holes 12 of the holder base 1. By means of the matching design between the protruding block 211 and the locating pins 24 of the lens device 2 and the foolproof notch 111 and the locating holes 13 of the holder base 1 respectively, the invention prevents incorrect installation of the lens device 2.

After installation of the lens device 2 in the holder base 1, the top cover 3 is capped on the holder base 1 to insert the retaining lugs 33 into the guide tracks 15 of the holder base 1 and to force the retaining holes 34 into engagement with the retaining blocks 16 of the holder base 1 respectively. By means of the sloping top surface 161 of each retaining block 16, the retaining lugs 33 are easily forced into engagement with the retaining blocks 16 of the holder base 1 to hold down the lens device 2 in the holder base 1, keeping the convex portions 22 of the lens device 2 in the through holes 31 of the top cover 3 respectively.

Figure 5:
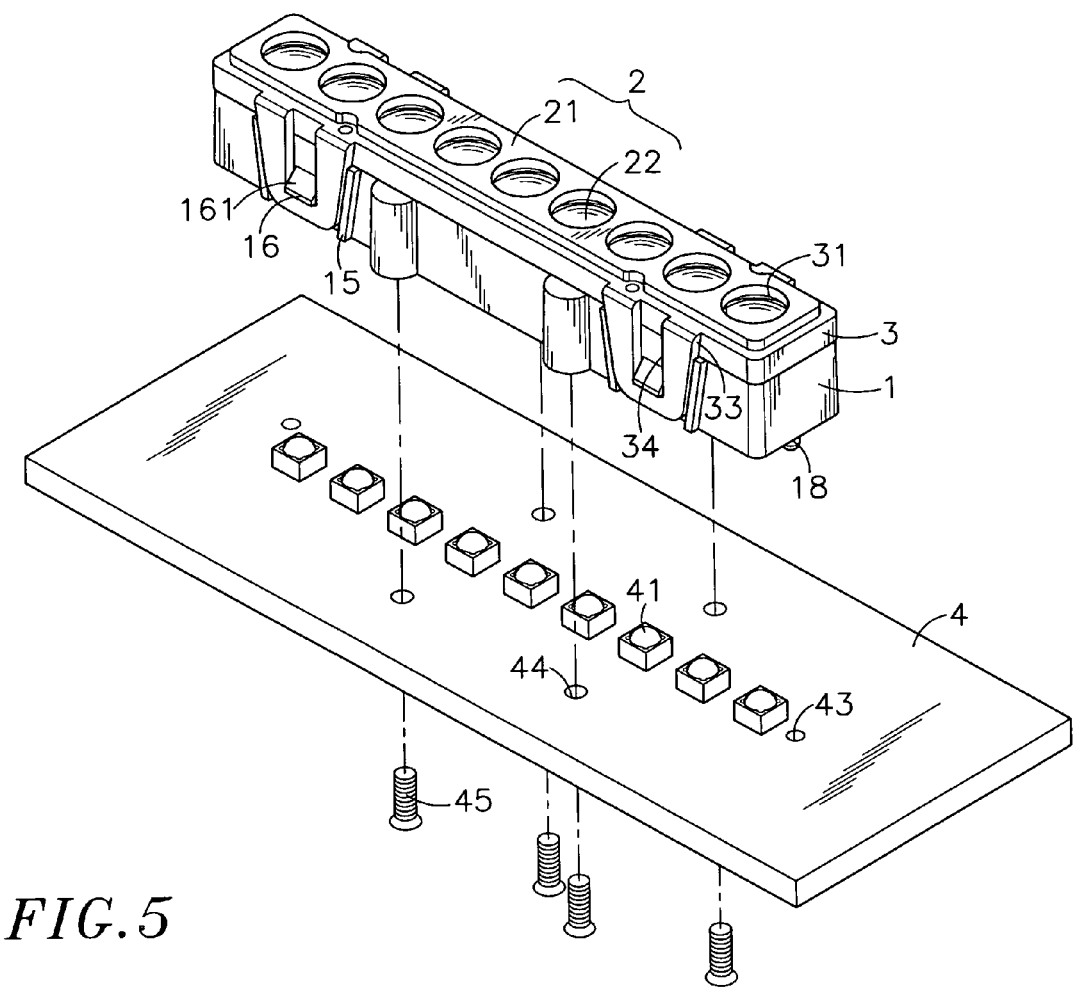
FIG. 5 is an exploded view of a lens module and a circuit board according to the present invention.
Figure 6:
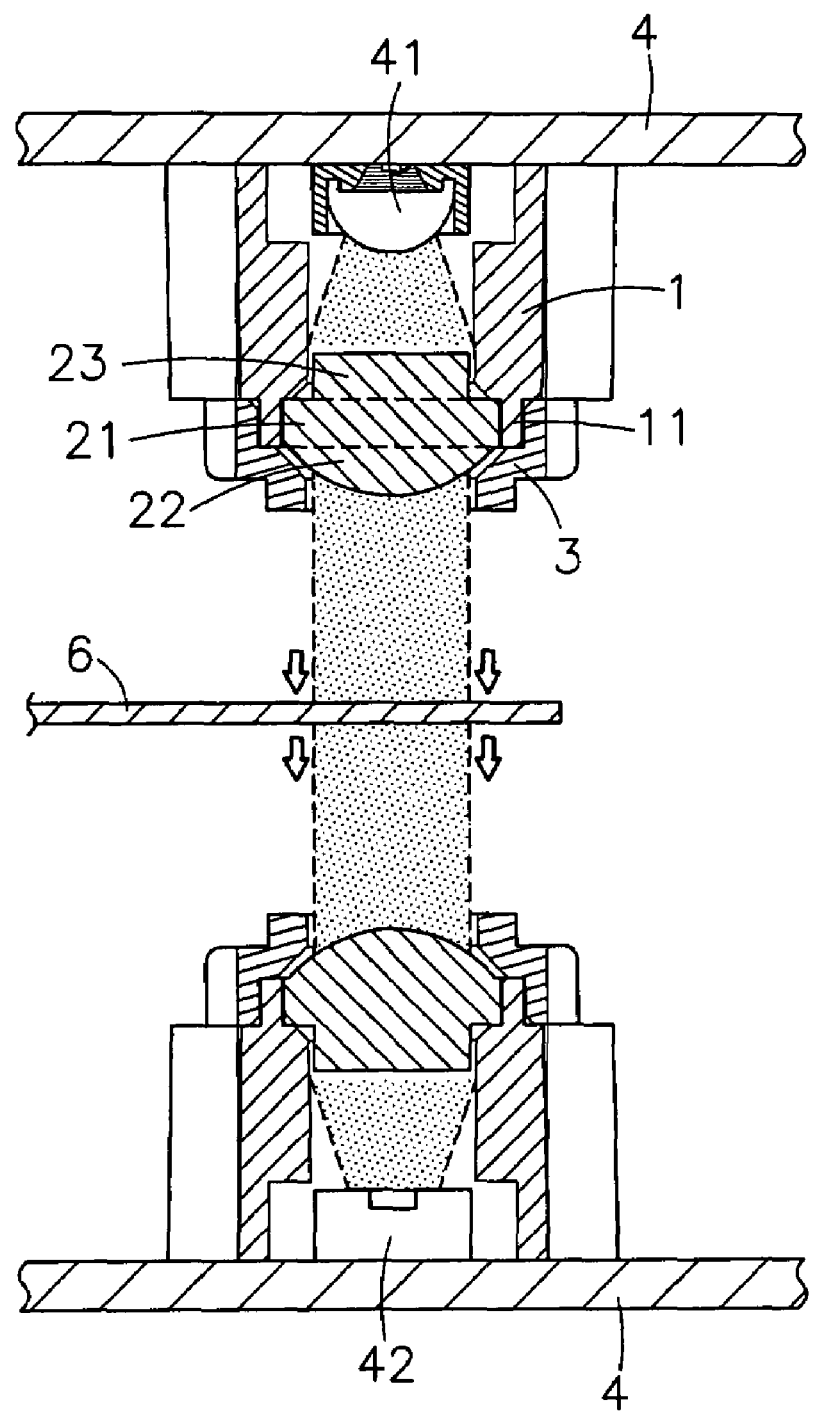
FIG. 6 is a schematic sectional view showing the use of the present invention in a bill acceptor.

Referring to FIGS. 5 and 6, the lens module of the present invention can easily be installed in a circuit board 4 that has a plurality of LEDs 41 or sensors 42 mounted thereon by means of SMT (Surface Mounting Technology). During installation, the bottom mounting rods 18 of the holder base 1 are respectively inserted into respective mounting holes 43 of the circuit board 4 to let the LEDs 41 or the sensors 42 be respectively received in the bottom receiving holes 17 of the holder base 1, and then the mounting portions 14 of the holder base 1 are respectively affixed to respective screw holes 44 of the circuit board 4 with respectively screws 45. After installation, the LEDs 41 or the sensors 42 are respectively aimed at the through holes 12 of the holder base 1 of the lens module. Therefore, the lens module can easily be installed in the circuit board 4, and the thickness of the circuit board 4 does not interfere with installation of the lens module.

Figure 7:
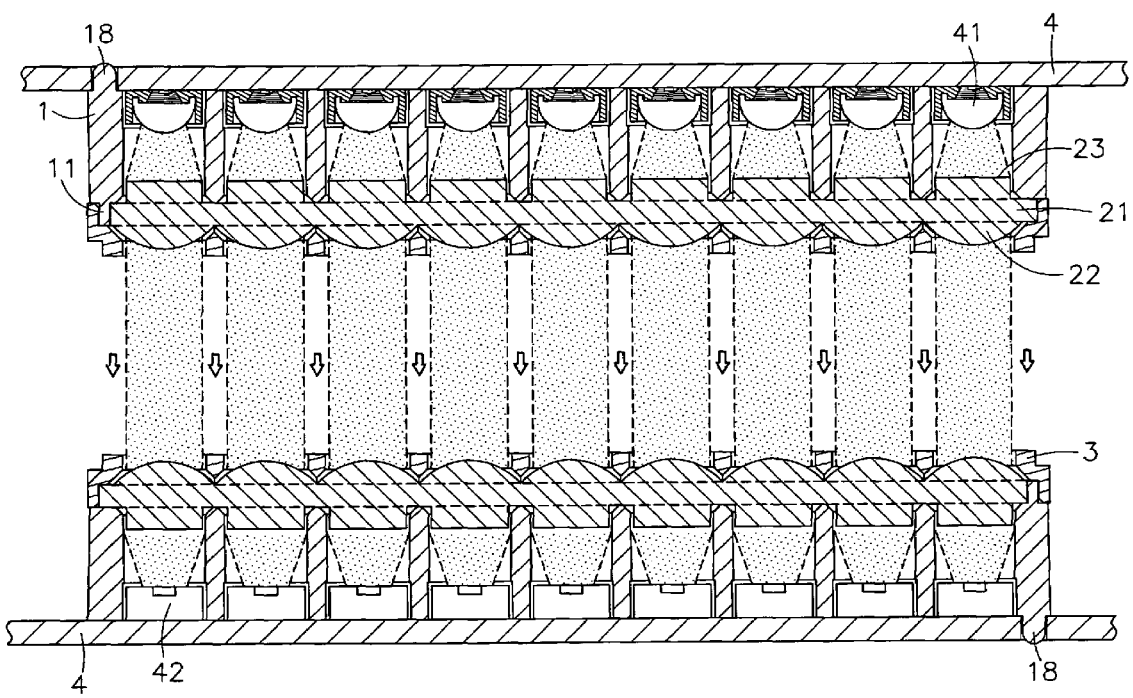
FIG. 7 is an enlarged view of a part of FIG. 6.

In actual practice, two lens modules are respectively installed in two circuit boards 4 (one carrying a set of LEDs 41 and the other carrying a set of sensors 42), and the two circuit board and lens module assemblies are set opposite to each other. One circuit board and lens module assembly is used as a light-emitting unit while the other circuit board and lens module assembly is used as a light-receiving unit. The light-emitting unit and the light-receiving unit are set in a bill acceptor (not shown) at two sides relative to a bill delivery path. When the LEDs 41 of the light-emitting unit are turned on, the LEDs 41 emit light through the flat protrusions 23 and the convex portions 22 toward the convex portions 22 of the lens module of light-receiving unit. By means of the effect of the convex portions 22 of the lens module of the light-emitting unit, parallel light beams go to the convex portions 22 of the lens module of light-receiving unit, and then condensed by the respective flat protrusions 23 of the lens module of the light-receiving unit onto the respective sensors 42 (see FIG. 7).

Further, the LEDs 41 can be designed having multiple LED chips for emitting different wavelengths of light, for example, 615 nm~635 nm red light, 515 nm~532 nm green light, 460 nm~475 nm blue light, and high transmissive 850 nm first infrared light or 940 nm second infrared light. By means of the control of the circuit board 4 of the light-emitting unit, intense pulsed light of different wavelengths can be given to one same portion of a bill 6 to be verified so that the security features of the bill 6 can be examined. The bill 6 to be verified can be a banknote, travel check, paper money, securities, etc. usable in automatic vending machines.

Figure 8:
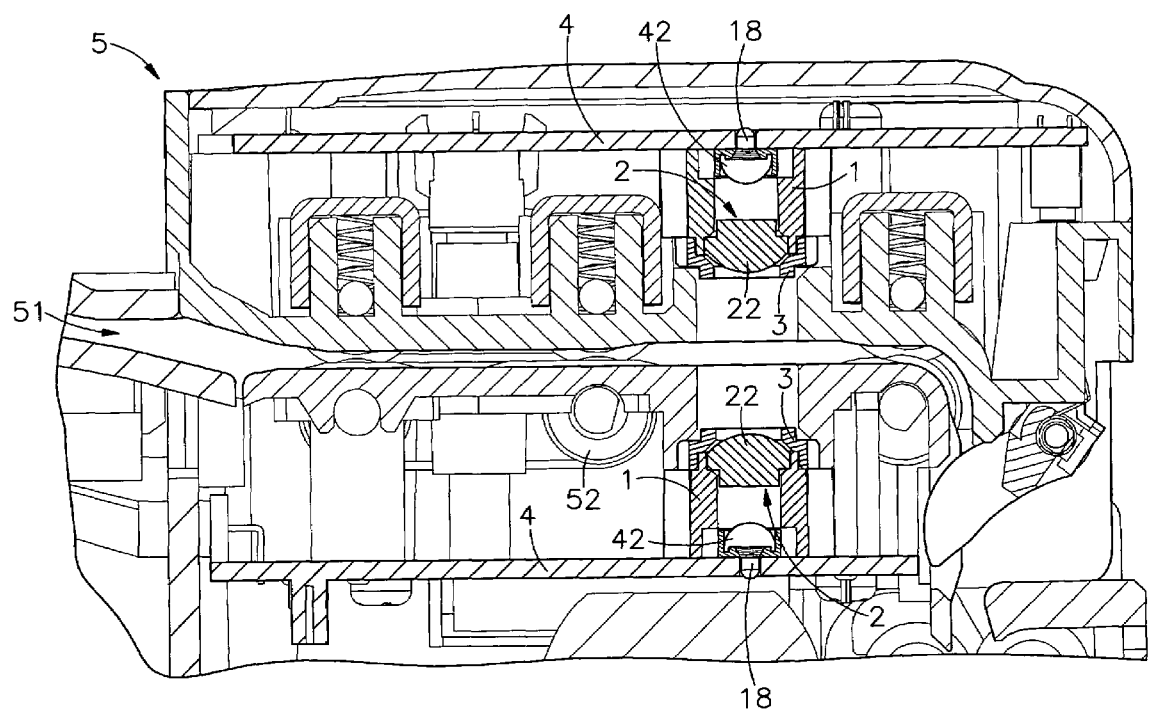
FIG. 8 is a sectional view of a part of a bill acceptor embodying the present invention.
Figure 9:
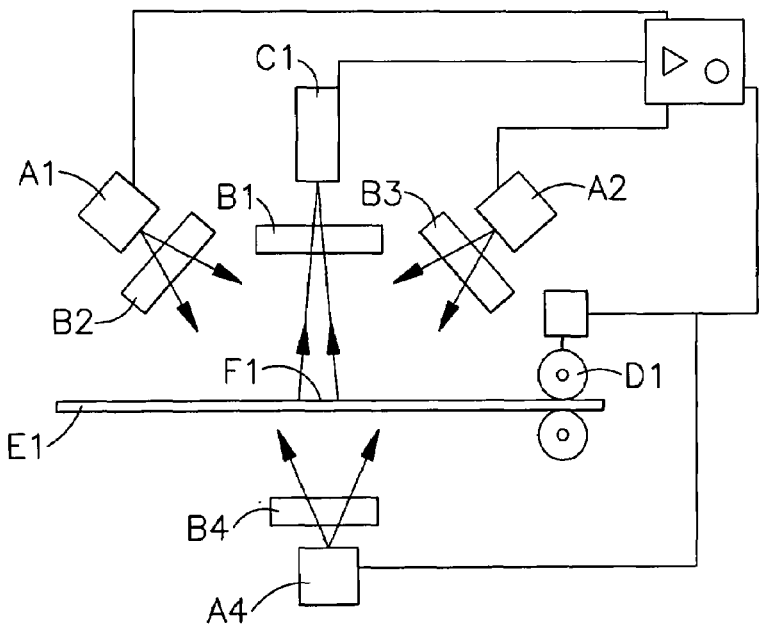
FIG. 9 is a schematic drawing showing the structure of a valuable paper (bill) validator according to the prior art.
Figure 10:
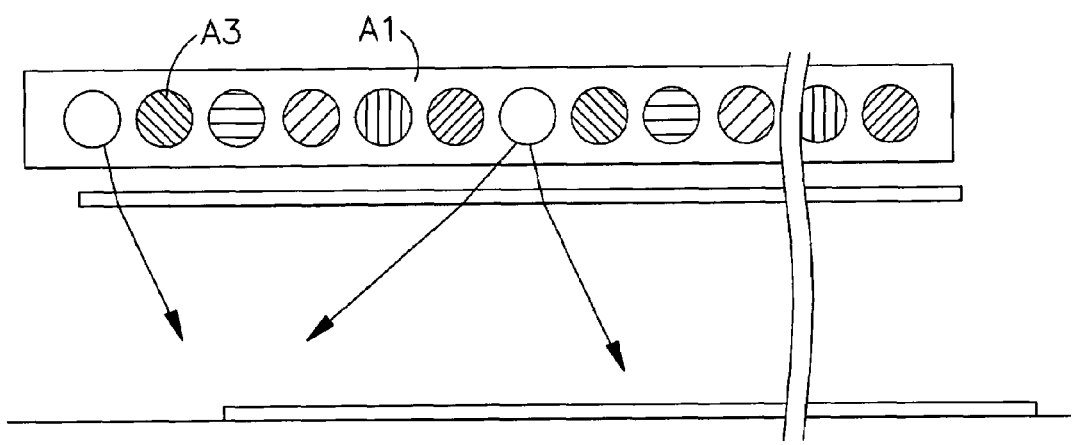
FIG. 10 is a schematic drawing showing the arrangement of a linear light source according to the prior art.

FIG. 8 is a sectional view showing an application example of the present invention in a bill acceptor 5 of an automatic vending machine. When a bill 6 is inserted into a bill delivery path 51 in the bill acceptor 5, a conveying mechanism 52 of the bill acceptor 5 carries the bill 6 through a gap between the two lens modules (the lens module of the light-emitting unit and the lens module of the light-receiving unit). At this time, the circuit board 4 of the light-emitting unit controls the LEDs 41 to emit intense pulsed light of different wavelengths through the associating lens module in direction from the associating flat protrusions 23 toward the associating convex portions 22, and the convex portions 22 of the lens module of the light-emitting unit direct the emitted light from the respective LEDs 41 to the same detected portion of the bill 6. When the light beam from each LED 41 passes through the detected portion of the bill 6, it goes to the corresponding convex portion 22 of the lens module of the light-receiving unit and is further condensed by the associating flat protrusion 23 onto the associating sensor 42. When induced by the light beams from the LEDs 41, the sensors 42 output a respective signal for comparing to a predetermined reference value set in the control unit of the bill acceptor 5 to determine the authenticity of the bill 6.

Verifying the authenticity of the bill 6 by means of the radiation of different wavelengths of light can be done in either one of two different ways. In one way, different wavelengths of light from the LEDs 41 are emitted to one same detected portion of the bill 6, and the detected portion of the bill 6 provides different transmission rates for comparing to a predetermined reference value to verify the authenticity of the bill 6. In the other way, a particular transmissive light is produced upon radiation of different wavelengths of light subject to the effect of the ink of the bill 6, and the sensors 42 pick up the transmissive light for comparing to a predetermined reference value to verify the authenticity of the bill 6.

As indicated above, the invention has the following features:

1. By means of aiming the protruding block 211 and the locating pins 24 of the lens device 2 at the foolproof notch 111 and the locating holes 13 of the holder base 1 and then forcing the lens device 2 into the inside of the top flange 11 of the holder base 1 and then fastening the top cover 3 to the holder base 1, the lens module is assembled, and the lens device 2 is accurately and positively positioned in between the holder base 1 and the top cover 3 against displacement. After installation of the lens module in a circuit board 4, the flat protrusions 23 of the lens device 2 are respectively and accurately aimed at the LEDs 41 or sensors 42 of the circuit board 4 for accurate detection.

2. By means of the mounting portions 14 and the bottom mounting rods 18 of the holder base 1, the lens module can easily be installed in a circuit board 4 to have the LEDs 41 or sensors 42 of the circuit board 4 be respectively received in the bottom receiving holes 17 of the holder base 1 and accurately aimed at the flat protrusion 23 of the lens device 2. When used in a bill acceptor 5 of an automatic vending machine, different wavelengths of light from the LEDs 41 are directed to the respective sensors 42 by the convex portions 22 of the lens device 2 without interference, and the sensors 42 can accurately receive different wavelengths of light passing from the LEDs 41 through the bill 6.

3. The lens device 2 is positively positioned in the holder base 1 and held down by the top cover 3. After installation of the lens module in the circuit board 4, the flat protrusion 23 of the lens device 2 are accurately aimed at the LEDs 41 or sensors 42 of the circuit board 4, and no further alignment between the lens device 2 and the LEDs 41 or sensors 42 of the circuit board 4 is necessary.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A lens module comprising:
   a holder base, said holder base having a top side, a bottom side, two opposite lateral sides, a top flange upwardly extending from the top side, a plurality of vertical through holes arranged in a row and surrounded by said top flange, a plurality of locating holes formed on the top side and disposed at two opposite sides relative to said vertical through holes within an area surrounded by said top flange, a foolproof notch at one end of said top flange, a plurality of mounting portions symmetrically disposed at the two opposite lateral sides for fastening to a circuit board, a plurality of guide tracks symmetrically arranged at the two opposite lateral sides, and a plurality of retaining blocks respectively protruded from the two opposite lateral sides in each of said guide tracks;

a lens device, said lens device having a narrow elongated flat lens base positioned in the top side of said holder base within said top flange, said flat lens base having a top surface and a bottom surface, a protruding block extending from one end of said flat lens base and engaged into said foolproof notch of said top flange of said holder base, a plurality of convex portions protruding from the top surface of said flat lens base, a plurality of flat protrusions protruded from the bottom surface of said flat lens base and respectively fitted into the through holes of said holder base, and a plurality of locating pins respectively extended from the bottom surface of said flat lens base and respectively fitted into the locating holes of said holder base; and a top cover capped on said holder base to hold down said lens device, said top cover having a plurality of through holes corresponding to the convex portions of said lens device, a bottom recess, which receives said top flange of said holder base and said lens device within said top flange, and a plurality of retaining lugs downwardly extending from two opposite lateral sides thereof and respectively engaged into said guide tracks of said holder base, said retaining lugs each having a retaining hole respectively forced into engagement with the retaining blocks of said holder base.

2. The lens module as claimed in claim 1, wherein the locating holes of said holder base are asymmetrically arranged at two opposite sides relative to said through holes.

3. The lens module as claimed in claim 1, wherein said holder base further has a plurality of locating rods asymmetrically provided at two sides of said top flange; said top cover has a plurality of locating holes formed in said bottom recess and respectively forced into engagement with the locating rods of said holder base.

4. The lens module as claimed in claim 1, wherein said guide tracks gradually reduce in width in direction from the top side of said holder base toward the bottom side of said holder base.

5. The lens module as claimed in claim 1, wherein said retaining blocks each have sloping top surface for guiding said retaining lugs into position.

6. The lens module as claimed in claim 1, wherein said holder base has a plurality of bottom mounting rods extending from the bottom side for fastening to a circuit board.

7. The lens module as claimed in claim 1, wherein said flat protrusions of said lens device have a cylindrical shape.

8. The lens module as claimed in claim 1, wherein said holder base has a plurality of bottom receiving holes formed on the bottom side thereof corresponding to said through holes for receiving a respective surface mounting light emitting diode/sensor on a circuit board.

9. The lens module as claimed in claim 1, wherein said mounting portions of said holder base are fixedly fastened to screw holes on a circuit board with a respective screw.

\* \* \* \* \*